(12) United States Patent
Batori (10) Patent No.: US 8,176,694 B2
(45) Date of Patent: May 15, 2012

(54) HEATED FLOOR SUPPORT STRUCTURE

(76) Inventor: Imre Batori, Fairfax, VA (US)

( * ) Notice: Subject to any disclaimer, the term of this patent is extended or adjusted under 35 U.S.C. 154(b) by 0 days.

(21) Appl. No.: 12/040,607

(22) Filed: Feb. 29, 2008

(65) Prior Publication Data
US 2009/0217605 A1 Sep. 3, 2009

(51) Int. Cl.
*E04C 2/52* (2006.01)
(52) U.S. Cl. ............. 52/220.2; 52/385; 52/386; 52/389; 52/747.11
(58) Field of Classification Search .............. 52/385, 52/386, 389, 220.1, 220.2, 747.11; 165/47, 165/49, 53, 54, 55, 56, 57; 237/69
See application file for complete search history.

(56) References Cited

U.S. PATENT DOCUMENTS

| | | | | |
|---|---|---|---|---|
| 3,037,746 | A | * | 6/1962 | Williams .................... 165/56 |
| 4,318,258 | A | * | 3/1982 | Heck ....................... 52/309.12 |
| 4,326,366 | A | * | 4/1982 | Werner ....................... 52/220.3 |
| 4,338,994 | A | | 7/1982 | Hewing et al. |
| 4,566,235 | A | | 1/1986 | Groll |
| 4,576,221 | A | | 3/1986 | Fennesz |
| 4,646,814 | A | | 3/1987 | Fennesz |
| 4,766,951 | A | | 8/1988 | Bergh |
| 4,878,332 | A | * | 11/1989 | Drake ....................... 52/745.05 |
| 4,917,933 | A | * | 4/1990 | Schluter ....................... 428/99 |
| 4,948,943 | A | | 8/1990 | Bruckner |
| 5,042,569 | A | * | 8/1991 | Siegmund .................... 165/56 |
| 5,052,161 | A | * | 10/1991 | Whitacre ....................... 52/385 |
| 5,327,737 | A | * | 7/1994 | Eggemar ....................... 62/66 |
| 5,743,330 | A | | 4/1998 | Bilotta et al. |
| 5,788,152 | A | | 8/1998 | Alsberg |
| 5,931,381 | A | * | 8/1999 | Fiedrich .................... 237/69 |
| 5,957,378 | A | | 9/1999 | Fiedrich |
| 6,151,854 | A | * | 11/2000 | Gutjahr ....................... 52/385 |
| 6,220,523 | B1 | * | 4/2001 | Fiedrich ....................... 237/69 |
| 6,283,382 | B1 | | 9/2001 | Fitzemeyer |
| 6,330,980 | B1 | | 12/2001 | Fiedrich |
| 6,434,901 | B1 | | 8/2002 | Schluter |
| 6,533,185 | B1 | | 3/2003 | Muir |
| 6,539,681 | B1 | | 4/2003 | Siegmund |

(Continued)

FOREIGN PATENT DOCUMENTS
CA 2639591 A1 3/2010
(Continued)

OTHER PUBLICATIONS

"Concrete and Radiant Floor Insulation" located at <http://www.thebarrierinsulation.com/26232.html?*session*id*key*=*session*id*val*> visited Jan. 9, 2008. (10 pages).

(Continued)

*Primary Examiner* — Basil Katcheves
*Assistant Examiner* — Beth Stephan
(74) *Attorney, Agent, or Firm* — Fitch, Even, Tabin & Flannery, LLP (57) ABSTRACT

A floor support structure is disclosed. According to an example of the disclosure, the support structure may include a surface, protrusions extending from the surface to form cavities between the protrusions, and openings adjacent to the protrusions to form pathways to the cavities. The support structure provides the openings and cavities to lay a cable in any desired configuration, in addition to the structure's established function to prevent a main floor from fracture or failure when an underlying subfloor shifts or settles. As such, the need for separate heating and support structures is eliminated.

14 Claims, 14 Drawing Sheets

U.S. PATENT DOCUMENTS

| | | | |
|---|---|---|---|
| 6,802,668 B2 * | 10/2004 | Parker | 405/49 |
| 7,013,609 B2 | 3/2006 | Hydock | |
| 7,021,372 B2 | 4/2006 | Pickard | |
| 7,140,426 B2 | 11/2006 | Huebner et al. | |
| D541,396 S | 4/2007 | Fawcett et al. | |
| 7,250,570 B1 * | 7/2007 | Morand et al. | 174/37 |
| 7,536,835 B2 * | 5/2009 | Schluter | 52/390 |
| 2004/0074631 A1 * | 4/2004 | Jeon | 165/53 |
| 2005/0229520 A1 * | 10/2005 | Julton | 52/443 |
| 2008/0017725 A1 * | 1/2008 | Backman | 237/69 |
| 2009/0026192 A1 * | 1/2009 | Fuhrman | 219/523 |

FOREIGN PATENT DOCUMENTS

| | | |
|---|---|---|
| DE | 103 57 937 A1 | 4/2005 |
| DE | 10357937 A1 | 7/2005 |
| JP | 2000299571 | 10/2000 |
| JP | 2006-105477 A | 4/2006 |
| JP | 20206/105477 A | 4/2006 |
| KR | 200172879 | 3/2000 |
| KR | 200276530 | 5/2002 |
| WO | 02/37032 A1 | 5/2002 |
| WO | WO-02/37032 A1 | 5/2002 |
| WO | 2005/064240 A1 | 7/2005 |
| WO | WO-2005/064240 A1 | 7/2005 |

OTHER PUBLICATIONS

"Warmly Yours, Warming Families Installation Manual for Your TempZone Electric Radiant Floor Heating System," http://www.warmlyyours.com/galleries/27/Tempzone-manual.pdf visited Apr. 9, 2008. pp. 1-18

HeatWeave Floor Warming Systems. (2003) "Floors that Feel Warm & Cozy," *Watts Radiant, Inc. HeatWeave Consumer Brochure.*

Watts Radiant Floor Heating & Snowmelting Internet Catalog "Warm Wire Cable," www.wattsradiant.com.

International Search Report dated Jul. 13, 2009 relating to European Patent Application PCT/US2008/084357.

Flextherm Floor Warming and Heating Systems Brochure, "Surround Comfort Enveloping Warmth" www.flextherm.com, (obtained in 2007).

Watts Radiant, Inc. (2006). "SunTouch . . . Like a Walk on the Beach,"Watts SunTouch Floor Warming Systems Brochure, www.suntouch.net on 4/093/2006.

Nuheat Industries Limited (2006). "Nuheat, Warmth for the Sole, Nuheat Cable Installation Manual" pp. 1-27.

Nuheat Industries Limited "Nuheat Installation Manual" pp. 1-17, (obtained in 2007).

Schluter Systems (2005). "The Universal Underlayment for Ceramic and Stone Tile, Schluter-DITRA installation Handbook" pp. 1-24 pgs.

Taunton Press (2005) "Fine Homebuilding, A Tile Floor that Won't Crack" www.finehomebuilding.com.

Concrete and Radiant Floor Insulation located at http://www.thebarrierinsulation.com/26232.html? *session*id*key=*session*id*val* visited Jan. 9, 2008 (10 pgs.).

Schluter Systems. (2006) "Innovative Solutions for Ceramic and Stone Tile" Modular Screed System pp. 1-6.

Warmly Yours, Warming Families Installation Manual for Your TempZone Electric Radiant visited Apr. 9, 2008. pp. 1-18.

HeatWeave Floor Warming Systems, (2003) "Floors that Feel Warm & Cozy," Watts Radiant, Inc. HeatWeave Consumer Brochure.

Watts Radiant Floor Heating & Snowmelting Internet Catalog "Warm Wire Cable," www.wattsradiant.com, (obtained in 2007).

"Uni-Mat Pro, The Universal Uncoupling Underlayment, Installation Procedures," Blanke (2006).

\* cited by examiner

FIG. 1

PRIOR ART

HEATED FLOOR SUPPORT STRUCTURE

FIELD OF THE DISCLOSURE

The disclosure of the present application relates to support structures for floors, in particular, support structures for floors that also support heating cables.

BACKGROUND

Traditionally, the flooring industry has successfully used an anti-fracture uncoupled support structure disposed between an underlying subfloor and a main floor to protect the main floor from cracking or failing as the subfloor shifts and settles. The support structure decouples the subfloor from the main floor, thereby isolating the subfloor movement from the main floor. Main floors made up of tile are particularly vulnerable to the effects of such subfloor movement.

Figure 1:
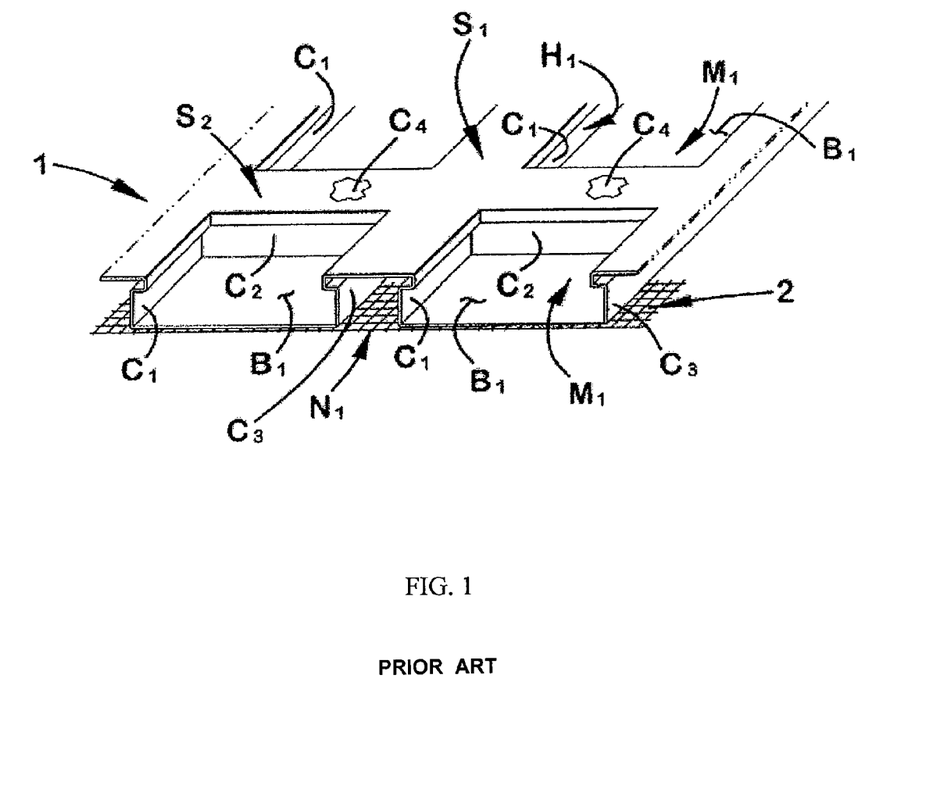
FIG. 1 is a diagram of a three-dimensional view of an example of a commonly used support structure.

FIG. 1 shows an example of a commonly-used support structure, as reproduced from and described in U.S. Pat. No. 6,434,901 by Schluter. Schluter describes a support plate made of a foil-like plastic material with protrusions that extend from the material in at least two orientations and intersect to form cavities. The support plate lies between a subfloor and a main floor and decouples the subfloor from the main floor. The support plate is attached to the subfloor with a type of adhesive, e.g., mortar, through a webbing on the underside of the plate. The support plate is filled and covered with mortar to hold the main floor thereon.

In recent years, heated flooring has become popular, in which heating structures are installed beneath the main floor to support heating cables that provide heat. In most cases, an electric heating cable is laid in the heating structure in a typical back-and-forth pattern underneath the area of the main floor to be heated. The heating cable is connected to a thermostat that provides temperature control. A common heating structure is a mat that has the heating cable built into the mat or between two layers of the mat glued together. Examples of such mats are provided by Nuheat™, Sun-Touch™, Thermosoft™, Warmly Yours™, and WattsRadiant™. However, since used with the support structure, such mats make up another layer to be added between the subfloor and the main floor. The construction of such multiple layers can result in added cost and installation time. Such multiple floor layers can also result in an uneven main floor caused by the elevation difference between the heated areas that include the mats and the unheated areas that do not. Moreover, with irregular shaped rooms or pipes and vents that protrude into the floor, such mats may require customization to properly cover the desired floor area. Such customization comes at substantial cost and required lead time. If changes occur to the floor after a customized mat is created, the customized mat must be modified. This is problematic because the customized mat cannot be modified easily and cannot be so modified without voiding the mat's warranty. Since changes in floor design frequently occur during construction, it then becomes necessary to either modify the customized mat or order a new one.

As an alternative to mats, the flooring industry has introduced another heating structure, cable strips, for laying heating cable. Cable strips are narrow plastic (or similar material) strips that include holders at spaced intervals to hold a cable. The strips are laid along the perimeter of the floor area to be heated. A heating cable is then strung in a typical back-and-forth pattern across the floor area between the cable strips and placed in the strips' holders at the floor perimeter. Examples of such cable strips are provided by Nuheat™ and Flextherm™. These cable strips provide a flexible arrangement for any shape of floor, thereby avoiding the customization sometimes required for mats. However, such cable strips can leave portions of the heating cable exposed on top of the floor. Also, the cables can be difficult to bond properly to the subfloor. In additional, like the mats, such strips can result in an uneven main floor caused by the elevation difference between the heated floor areas that include the cable and cable strips and the unheated floor areas that do not. Also, like the mats, since used with the support structure, the cable and cable strips make up another layer to be added at additional cost and installation time.

As another alternative, panels have been introduced as heating structures for laying heating cable. One such panel is described in WO 02/37032 by Altepost, which describes a modular heating panel having a flat rectangular base body and cavities in a grid-like channel configuration for holding thermal conduits. Another such panel is described in U.S. D541, 396 by Fawcett, which describes a radiant heat floor panel having flower-shaped elements and channels around and between the elements through which thermal elements run. Another such panel is manufactured by Schluter™, which has circular elements spaced apart by channels through which heating tubes run. Another such panel is described in U.S. Pat. No. 6,539,681 by Siegmund, which describes a spacer plate having spacers on the bottom of the plate to form a hollow floor and grooves in the top surface of the plate to hold heating or cooling pipes. These panels provide a quick way to cover large areas with heating elements. However, like mats, such panels may make up another layer, in addition to the support structure, to be added at additional cost and installation time. As before, there may also be the uneven main floor possibility with the added panel layer.

Accordingly, there is a need for an effective way to lay cables that avoids the above-mentioned drawbacks.

SUMMARY

In order to provide an effective way to lay cables, the present disclosure teaches a support structure that combines the established functionality of both a commonly used support structure and a commonly used heating structure into a single structure that supports a floor to prevent fracture and failure and also supports a heating cable to heat the floor. As such, the need for a separate heating structure is eliminated. This results in a simpler, less expensive, and more effective floor support structure than those commonly used.

For example, the support structure may include protrusions extending from the surface of the structure, cavities formed between the protrusions, and openings or slots adjacent to the protrusions to form pathways to adjacent cavities. The structure's protrusions and cavities may then provide the floor support. The structure's openings and cavities may then provide placement for heating cables.

For example, the support structure may be included in a cable system that also includes a cable supported by the structure.

The methods of the present disclosure may include a method for supporting a cable in the support structure and a method for making the support structure.

DETAILED DESCRIPTION

The present disclosure teaches a floor support structure that provides protrusions extending from the structure surface to form cavities and slots adjacent to the protrusions to provide pathways to the cavities. These slots support heating cables in the way that, traditionally, a separate heating structure does. As such, the traditional separate heating structure is eliminated. The support structure also maintains its established function to flexibly support a main floor in order to prevent fractures or failures due to movement of an underlying subfloor. The result is a simpler, less expensive, and more effective support structure that provides at least the same level of performance as the commonly used support structure of FIG. 1 and the commonly used heating structure of mats, cable strips, panels, etc.

FIG. 1 is a diagram of an example of the commonly used support structure as described in U.S. Pat. No. 6,434,901 by Schluter. In FIG. 1, support plate 1 provides the established function of decoupling an underlying subfloor from a main floor to prevent the main floor from fracture and failure as the subfloor shifts and settles. The support plate 1 includes protrusions $N_1$, $N_2$, $S_1$, and $S_2$ that extend upward and run in horizontal and vertical directions to intersect at right angles to form cavities $M_1$ between the protrusions $N_1$, $N_2$, $S_1$, and $S_2$. Each cavity $M_1$ has a rectangular shape with a base region $B_1$ and four side regions $C_1$-$C_4$. Each cavity $M_1$ also has an undercut $H_1$ disposed about the periphery of the cavity $M_1$ and overhanging the cavity $M_1$ as part of the protrusions $N_1$, $N_2$, $S_1$, and $S_2$, such that the protrusions $N_1$, $N_2$, $S_1$, and $S_2$ have a T-shaped cross-section. The plate 1 has a webbing 2 on the underside. Upon installation, the cavities $M_1$ are filled with a filler, e.g., mortar, and the plate 1 covered with the filler in order to hold the main floor. The webbing 2 is disposed in adhesive, e.g., mortar, to attach the plate 1 to the subfloor.

Other examples of the commonly used support structure are also described in U.S. Pat. No. 6,434,901 by Schluter, as mentioned previously.

As seen in FIG. 1, support plate 1 is not configured to support a heating cable. As such, for heated flooring, a heating structure to support the heating cable is needed as an additional layer between the subfloor and the main floor. As described above, such heating structures, e.g., mats, cable strips, and panels, are problematic for the reasons previously mentioned.

Figure 2:
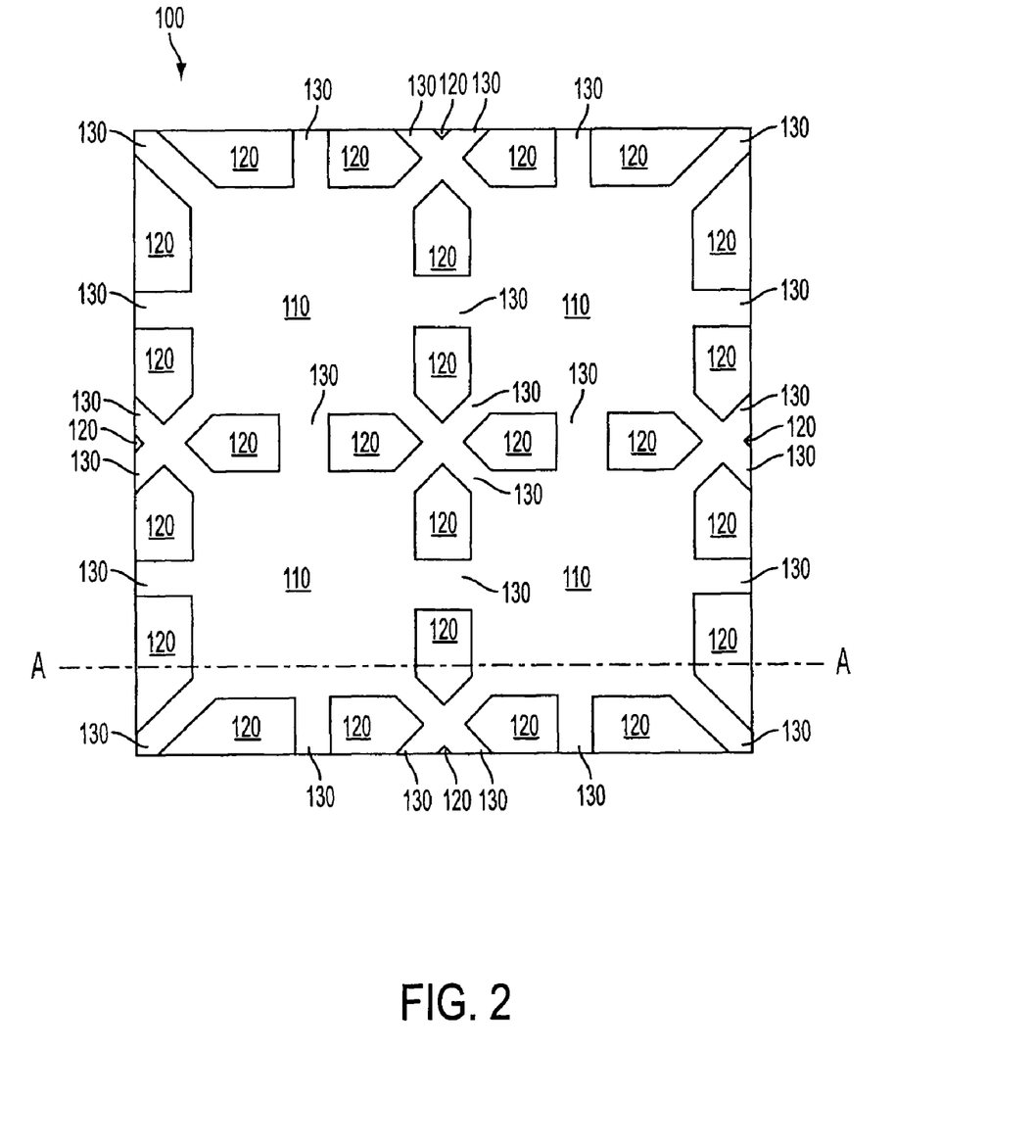
FIG. 2 is a diagram of a top view of an example of a support structure of the present disclosure.

FIG. 2 is a diagram of a top view of an example of a support structure according to the present disclosure that is different from the commonly used support structure of FIG. 1. In FIG. 2, support structure 100 combines the function of decoupling an underlying subfloor from a main floor to prevent main floor fracture or failure with the function of supporting heating cables for heated flooring. The support structure 100 includes protrusions 120 that extend upward and run in horizontal and vertical directions at right angles to form cavities 110 between the protrusions 120. Each cavity 110 has a rectangular shape with a base region defined by the locations of the surrounding protrusions 120 and side regions formed of the protrusions 120. Optionally, each cavity 110 can also have an undercut (not shown) disposed about the periphery of the cavity 110 and overhanging the cavity 110 as part of the protrusions 120, such that the protrusions 120 have a T-shaped cross-section. The support structure 100 has slots 130 made adjacent to the protrusions 120. The slots 130 are oriented horizontally, vertically, and/or diagonally adjacent the protrusions 120 and provide pathways to adjacent cavities 110. The depth of the slots 130 measures from the tops of the protrusions 120 to the floor of the cavities 110. A difference between the commonly used support structure of FIG. 1 and the support structure of FIG. 2 according to the present disclosure is the presence of the slots 130, which vertically and horizontally bisect the protrusions of FIG. 1 and diagonally bisect the intersections of the protrusions of FIG. 1.

There are many advantages of the support structure according to the present disclosure. For example, the support structure combines two structures into one, thereby requiring only one layer between an underlying subfloor and a main floor for support and heating. This single layer saves cost and installation time, eliminates the uneven main floor possibility, and avoids any cable exposure. No additional tools, skills, or materials are needed because the support structure and heating cable are installed in the same way as commonly done. The support structure can be cut into any shape to accommodate any floor shape or obstacles. The multiple orientations and locations of the slots allow the heating cable to be placed in any configuration on the support structure, such that any floor shape can be heated. The support structure can adapt to last minute changes in layout of the heated flooring up until the main floor is laid. The support structure is safe for foot traffic during installation because the heating cable is safely protected by the support structure protrusions. The support structure also provides a thin lightweight structure easily handled and installed, thereby minimizing the mass of material needed to provide heating and floor support.

The support structure 100 may be flexible and may include any material, such as plastic, resin, or any suitable polymer, capable of supporting a floor and cables. The support structure 100 may include a single material or a combination of different materials.

The support structure 100 may be fabricated in several ways. For example, the support structure 100 may be fabricated using a molding method, in which molten material may be injected into a mold of the structure 100, where the mold includes elements to form the protrusions 120, the slots 130, and the cavities 110. When the material cools, the mold may open and eject the molded material. In some cases, multiple molds may be used, e.g., to step-wise form particular protrusions 110, slots 130, and cavities 110, where the molded material is cooled between each mold and ejected after the final mold. Or the support structure 100 may be fabricated using a pressing method, where a malleable material is stretched and pressed by machinery into a desired shape for the protrusions 120, the slots 130, and the cavities 110. Or the support structure 100 may be fabricated in the same way as the commonly used support structure of FIG. 1 and then the slots 130 made in the protrusions as described below. The fabricated support structure 100 may be wound into a roll or laid out in flat sheets.

The slots 130 of the support structure 100 may be fabricated in several ways. For example, as described above, the slots may be originally made as part of the support structure using, e.g., molding or pressing. Or, as described above, the slots may be made after the support structure is fabricated as follows. A cutting method may be used to cut away portions of the protrusions 120 to form the slots 130. Or a tunneling method may be used to tunnel through the protrusions 120 to form the slots 130. The slots 130 may be open from top to bottom of the protrusions 120 as shown in FIG. 2. Alternatively, the slots 130 may form tunnels through a mid-portion of the protrusions 120.

In some embodiments, the cavities are substantially identical in size and shape to each other. In other embodiments, the cavities are different in size and shape from each other. The shapes and sizes of the protrusions help define the size and shape of the cavities. In some embodiments, the slots are substantially identical in width and shape to each other. In other embodiments, the slots are different in width and shape from each other. The slots can be linear, curved, or a combination thereof and oriented horizontally, vertically, diagonally, or any combination thereof.

Figure 3:
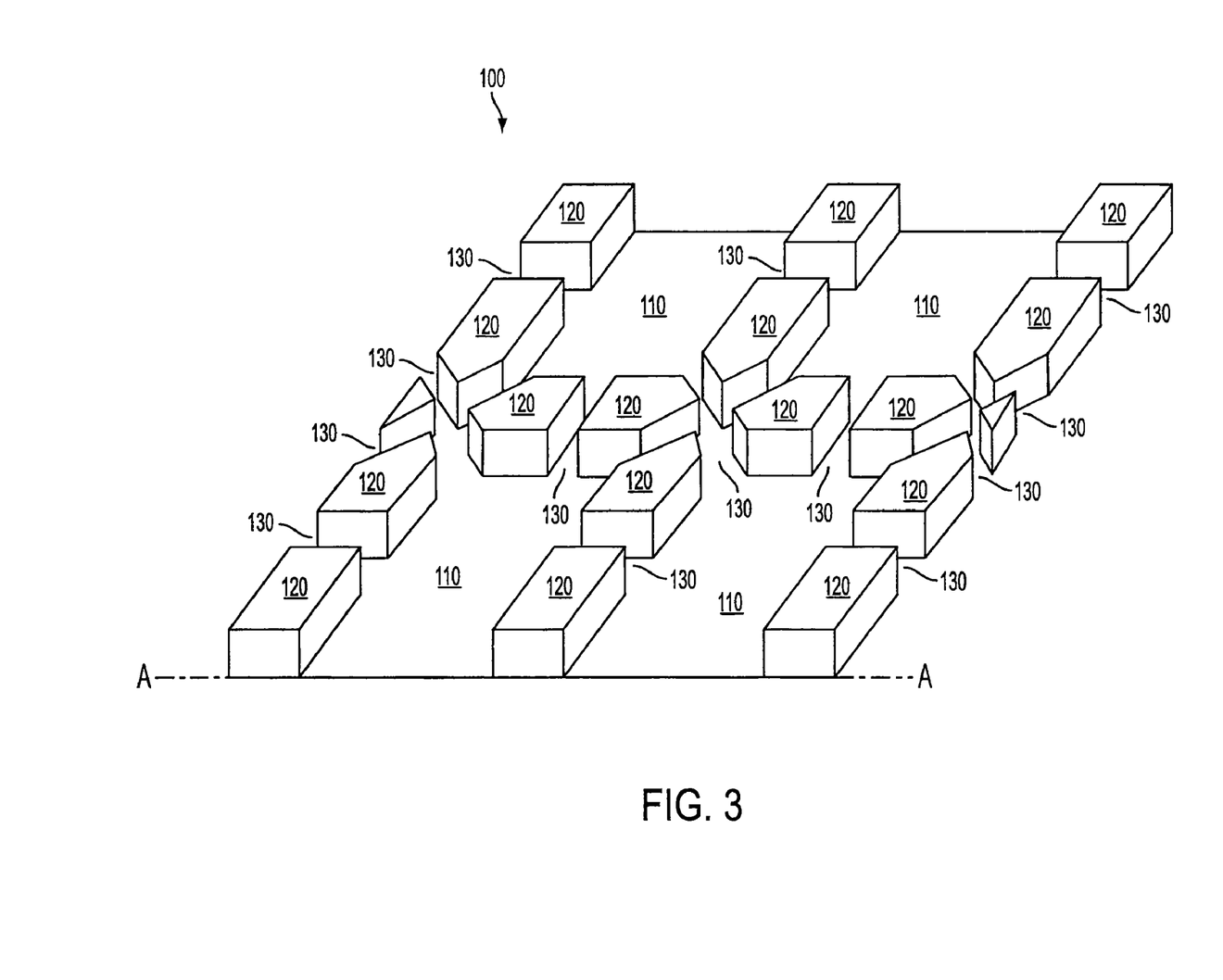
FIG. 3 is a diagram of a three-dimensional view of an example of the support structure of the present disclosure of FIG. 2 along section line A-A.

FIG. 3 is a diagram of a three-dimensional view of an example of the support structure of FIG. 2. Here, the slots 130 are clearly shown adjacent to the protrusions 120 as pathways to the cavities 110. The protrusions 120 are shown here as solid on the inside. The protrusions 120 may be solidly formed of a block of the support structure material or may be solidly filled with a filler. Alternatively, the protrusions 120 may be hollow or partially solid, if needed for a particular application.

Figure 4:
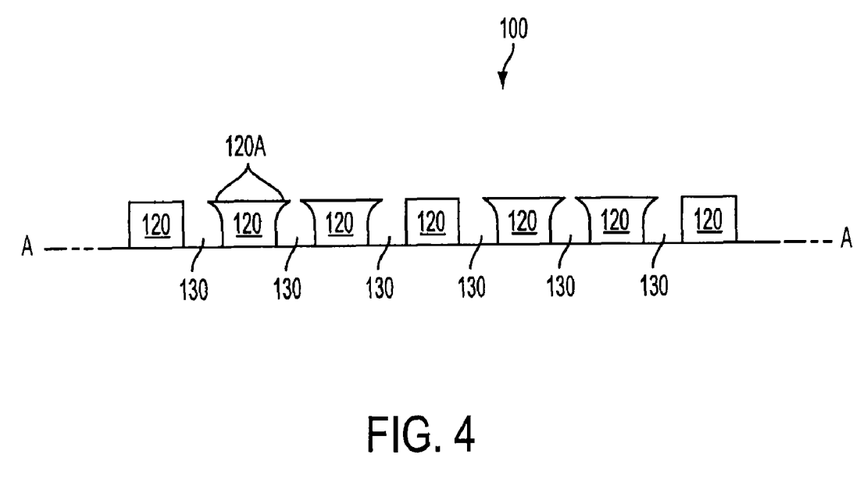
FIG. 4 is a diagram of a side view of an example of the support structure of the present disclosure of FIG. 2 along section line A-A.

FIG. 4 is a diagram of a side view of an example of the support structure of FIG. 2. Here, the protrusions 120 and the slots 130 are shown. To hold the cables within the slots 130, the protrusions 120 have small extensions 120A at the top of the protrusions 120 that overhang the slots 130 to provide a dove-tail configuration for the slots 130. This allows the heating cable to easily snap into the slot 130 but be constrained by the extensions 120A from snapping back out. Other types of constraints may be used to hold the cables in the slots 130, including, but not limited to, hooks, snaps, adhesives, tape, and any other elements capable of constraining a cable.

Figure 5:
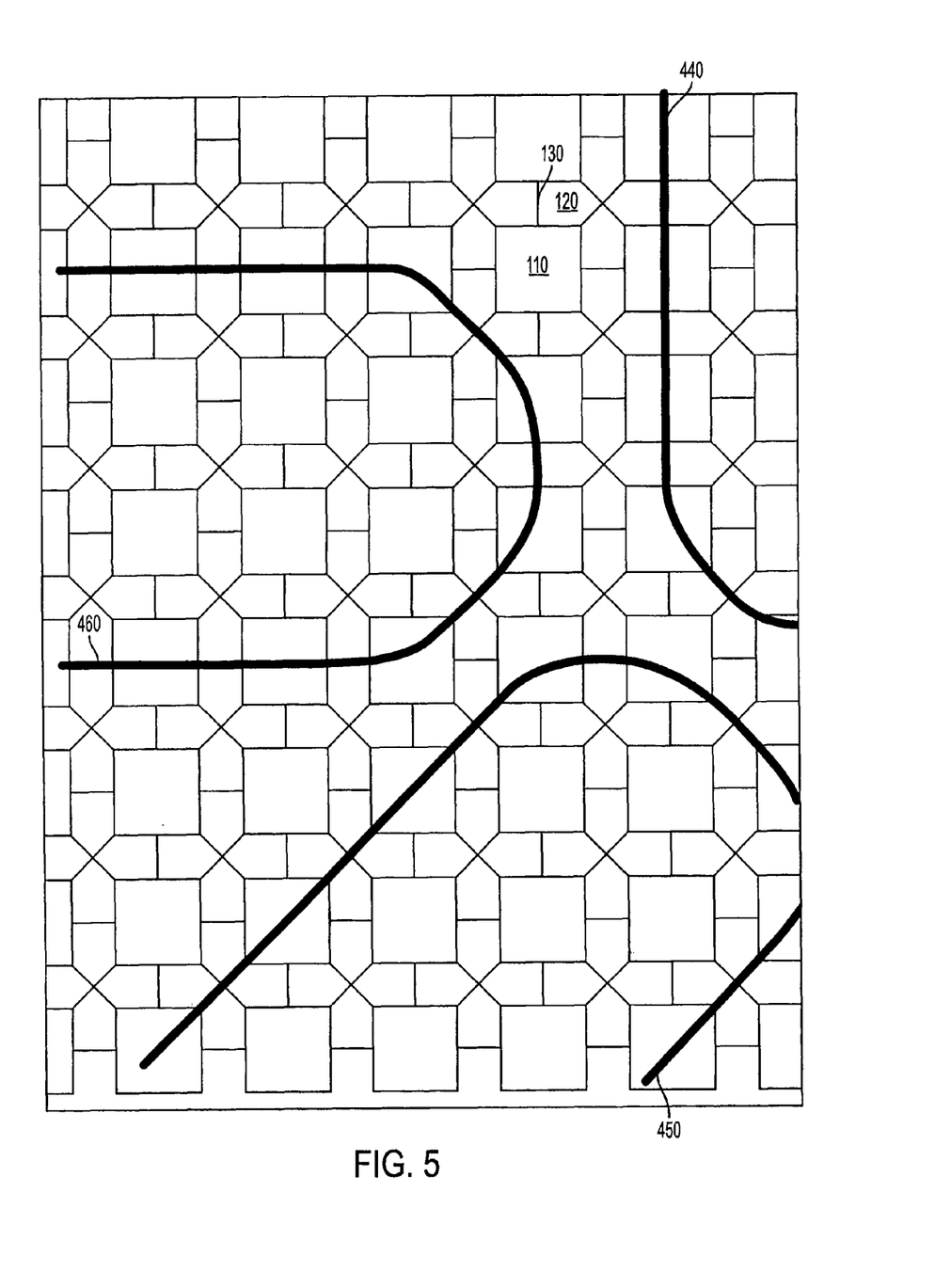
FIG. 5 is a diagram of a top view of an example of the support structure of the present disclosure of FIG. 2 with cables supported therein.

FIG. 5 is a diagram of a top view of an example of the support structure of FIG. 2 supporting cables therein. Here, cables 440, 450, and 460 are laid in the slots 130 of the support structure 100. Due to the different orientations and positions of the slots, the cables can be laid in any configuration desired for the appropriate placement and effect. Here, cable 440 is laid in a vertical pattern. Cable 450 is laid in a diagonal pattern. Cable 460 is laid in a horizontal pattern.

Figure 6:
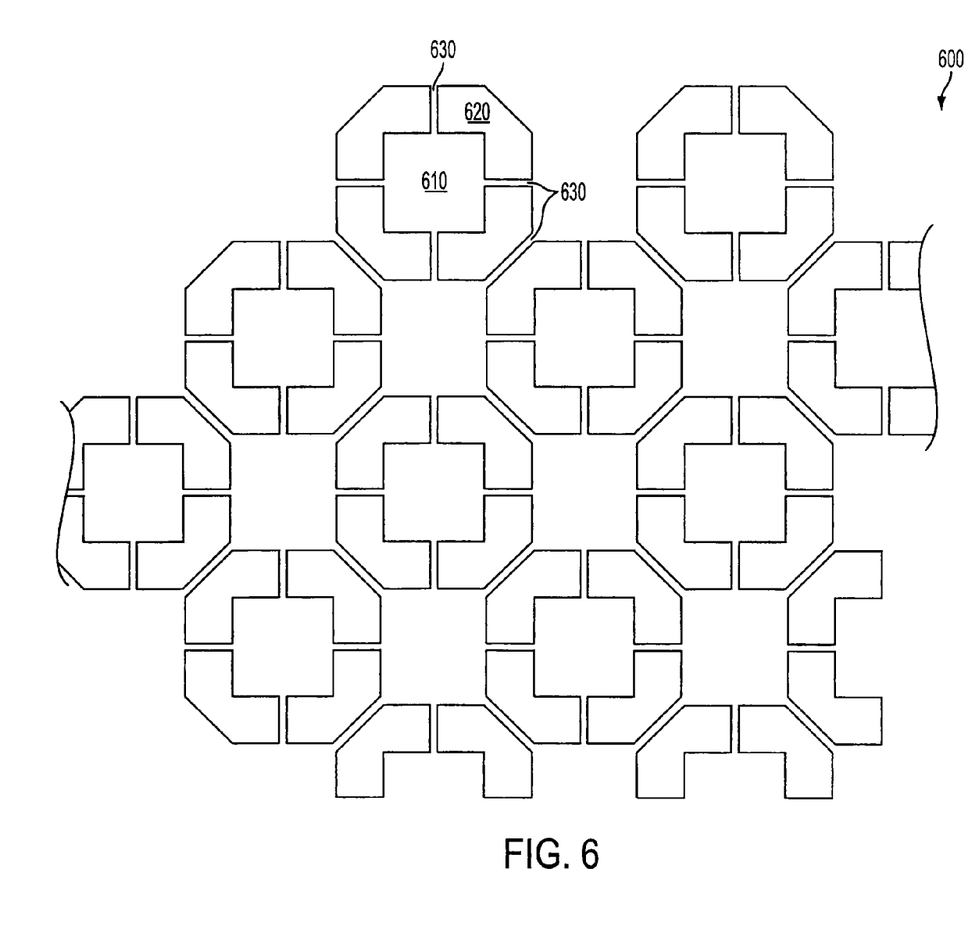
FIG. 6 is a diagram of a top view of an example of a support structure of the present disclosure with single diagonal slots.

FIG. 6 is a diagram of a top view of an example of another support structure of the present disclosure that has single diagonal slots. The support structure 600 is the same as the support structure 100 of FIG. 2, except rather than have crossed diagonal slots 130, the slots 630 are single diagonals. Hence, the support structure 600 includes protrusions 620 extending from the surface in such a manner to form rectangular shaped cavities 610. Slots 630 are made adjacent to the protrusions 620 and oriented in multiple directions to allow cable to be laid in any configuration.

Figure 7:
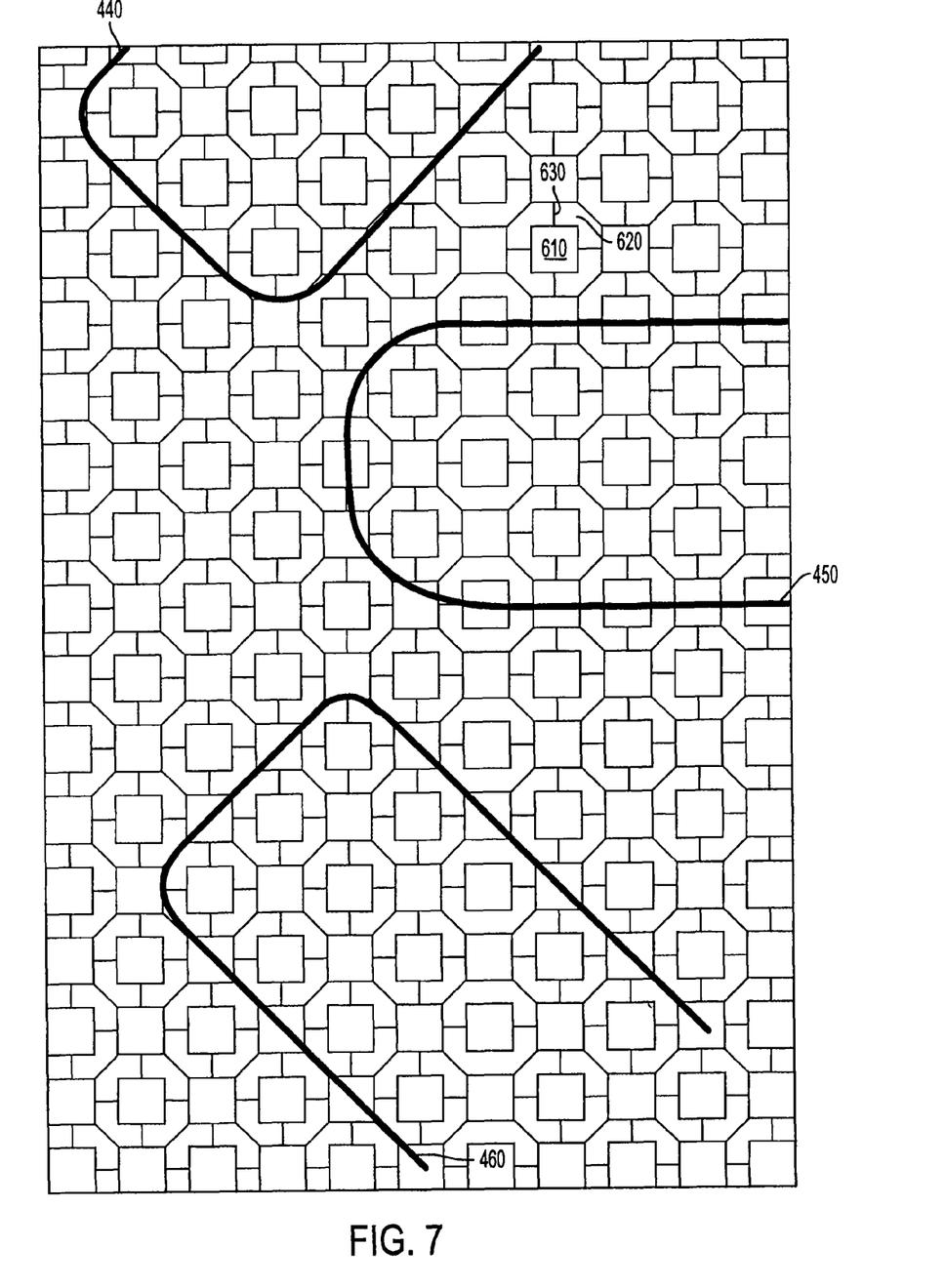
FIG. 7 is a diagram of a top view of an example of the support structure of the present disclosure of FIG. 6 with cables supported therein.

FIG. 7 is a diagram of a top view of an example of the support structure of FIG. 6 supporting cables therein. Here, cable 440 is laid in a diagonal pattern. Cable 450 is laid in a horizontal pattern. Cable 460 is laid in an opposite diagonal pattern.

Figure 8:
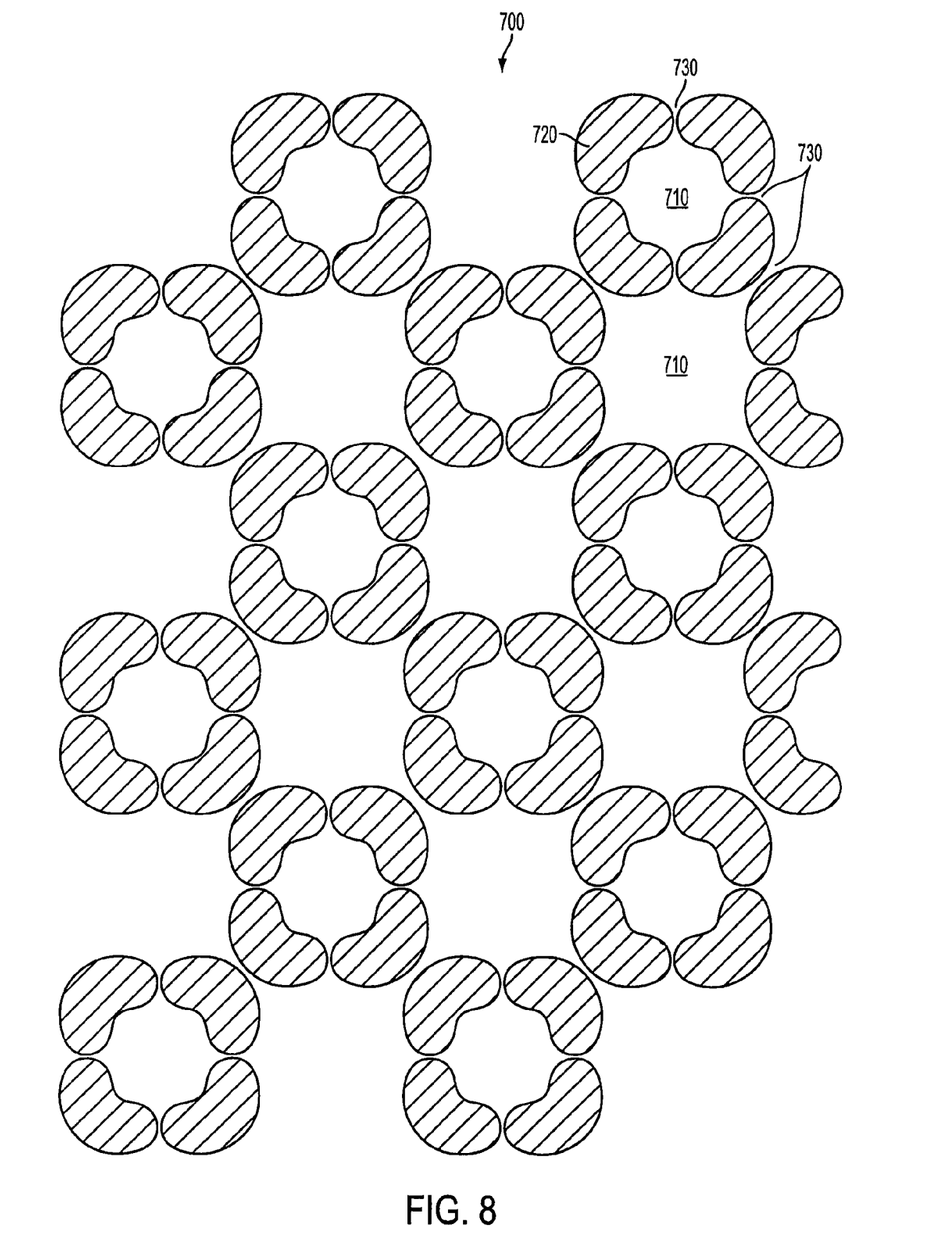
FIG. 8 is a diagram of a top view of an example of a support structure of the present disclosure with curved protrusions and slots.

FIG. 8 is a diagram of a top view of an example of another support structure of the present disclosure that has curved protrusions and curved slots. The support structure 700 includes protrusions 720 with curved corners, the protrusions 720 extending from the surface in such a manner to form rectangular-like shaped cavities 710. Some of the cavities 710 are formed on the inner side of surrounding protrusions 720 and other cavities 720 are formed on the outer side of the surrounding protrusions 720. As a result, the protrusions 720 have different shapes and sizes. Slots 730 are made adjacent to the protrusions 720 with curved openings and oriented in multiple directions to allow cables to be laid in any configuration.

Figure 9:
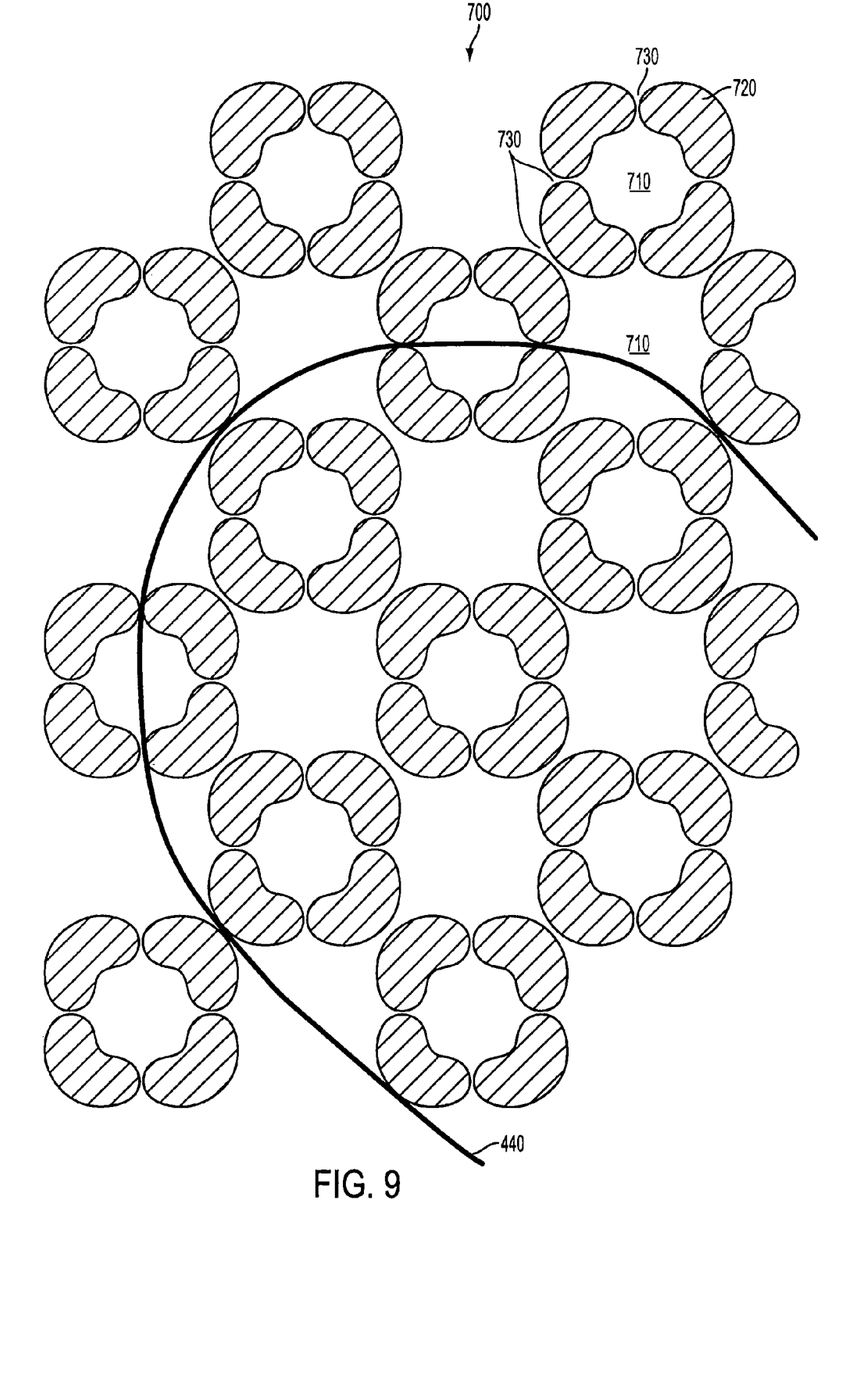
FIG. 9 is a diagram of a top view of an example of the support structure of the present disclosure of FIG. 8 with cables supported therein.

FIG. 9 is a diagram of a top view of an example of the support structure of FIG. 8 supporting a cable therein. Here, cable 440 is laid in a diagonal pattern.

Figure 10:
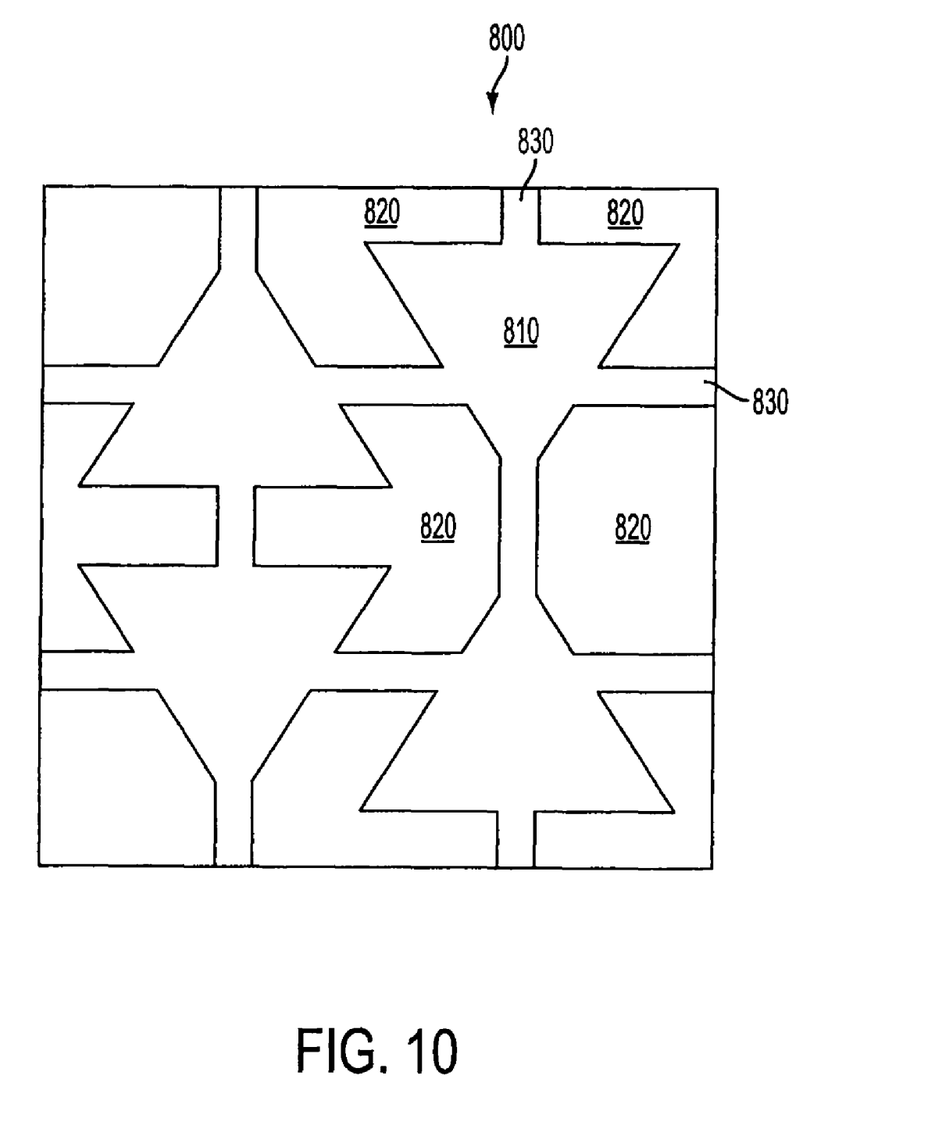
FIG. 10 is a diagram of a top view of an example of a support structure of the present disclosure with triangular cavities.

FIG. 10 is a diagram of a top view of an example of another support structure of the present disclosure that has triangular shaped cavities. The support structure 800 includes protrusions 820 extending from the surface in such a manner to form triangular shaped cavities 810. Slots 830 are made adjacent to the protrusions 820 and oriented in multiple directions to allow cable to be laid in any configuration.

Figure 11:
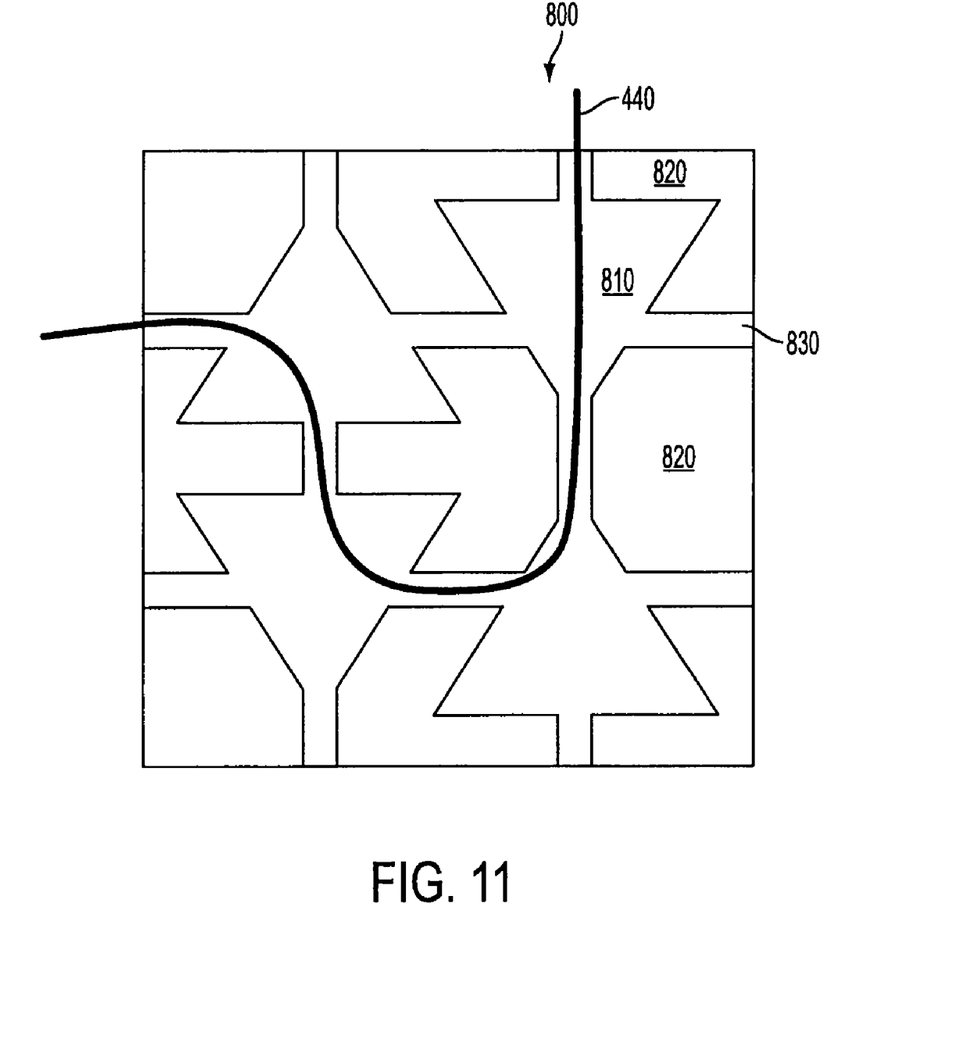
FIG. 11 is a diagram of a top view of an example of the support structure of the present disclosure of FIG. 10 with cables supported therein.

FIG. 11 is a diagram of a top view of an example of the support structure of FIG. 10 supporting a cable therein. Here, cable 440 is laid in both a vertical and horizontal pattern.

Figure 12:
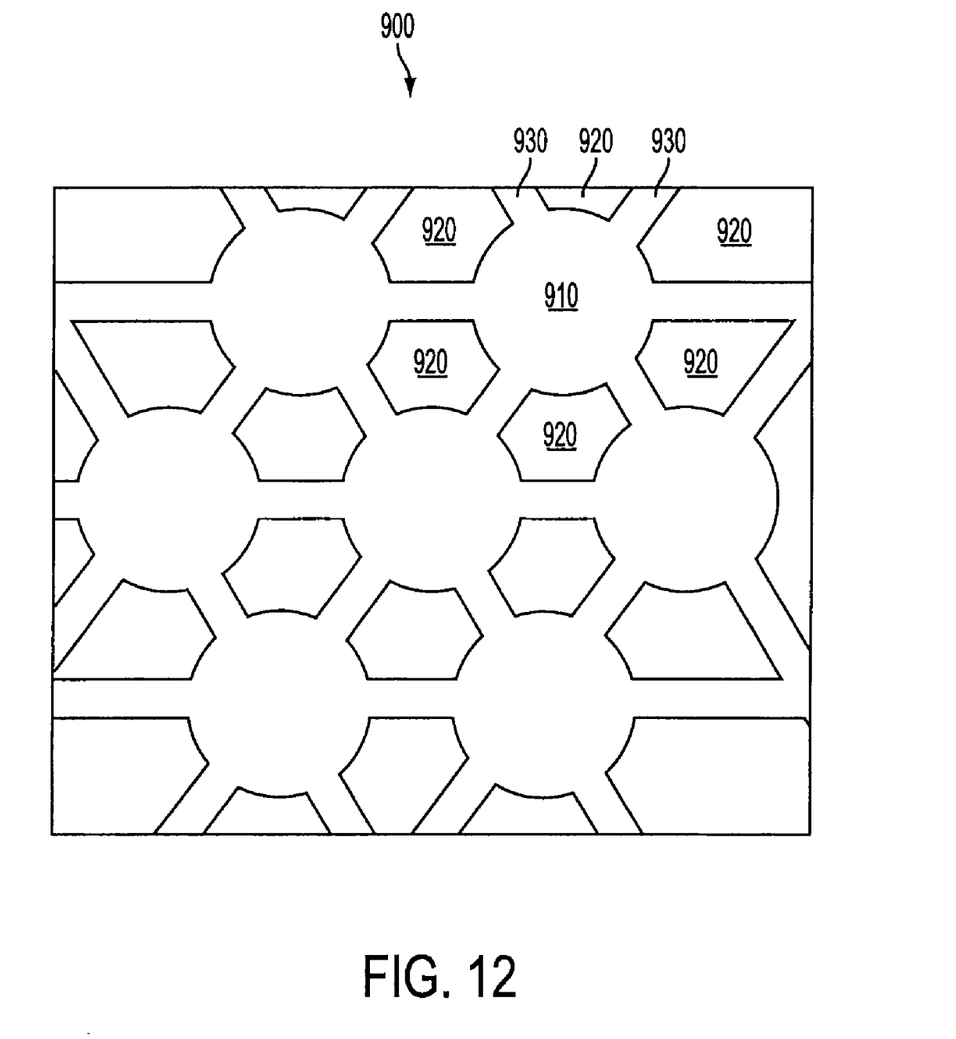
FIG. 12 is a diagram of a top view of an example of a support structure of the present disclosure with circular cavities.

FIG. 12 is a diagram of a top view of an example of another support structure of the present disclosure that has circular shaped cavities. The support structure 900 includes protrusions 920 extending from the surface in such a manner to form circular shaped cavities 910. Slots 930 are made adjacent to the protrusions 920 and oriented in several directions to allow cable to be laid in any configuration.

Figure 13:
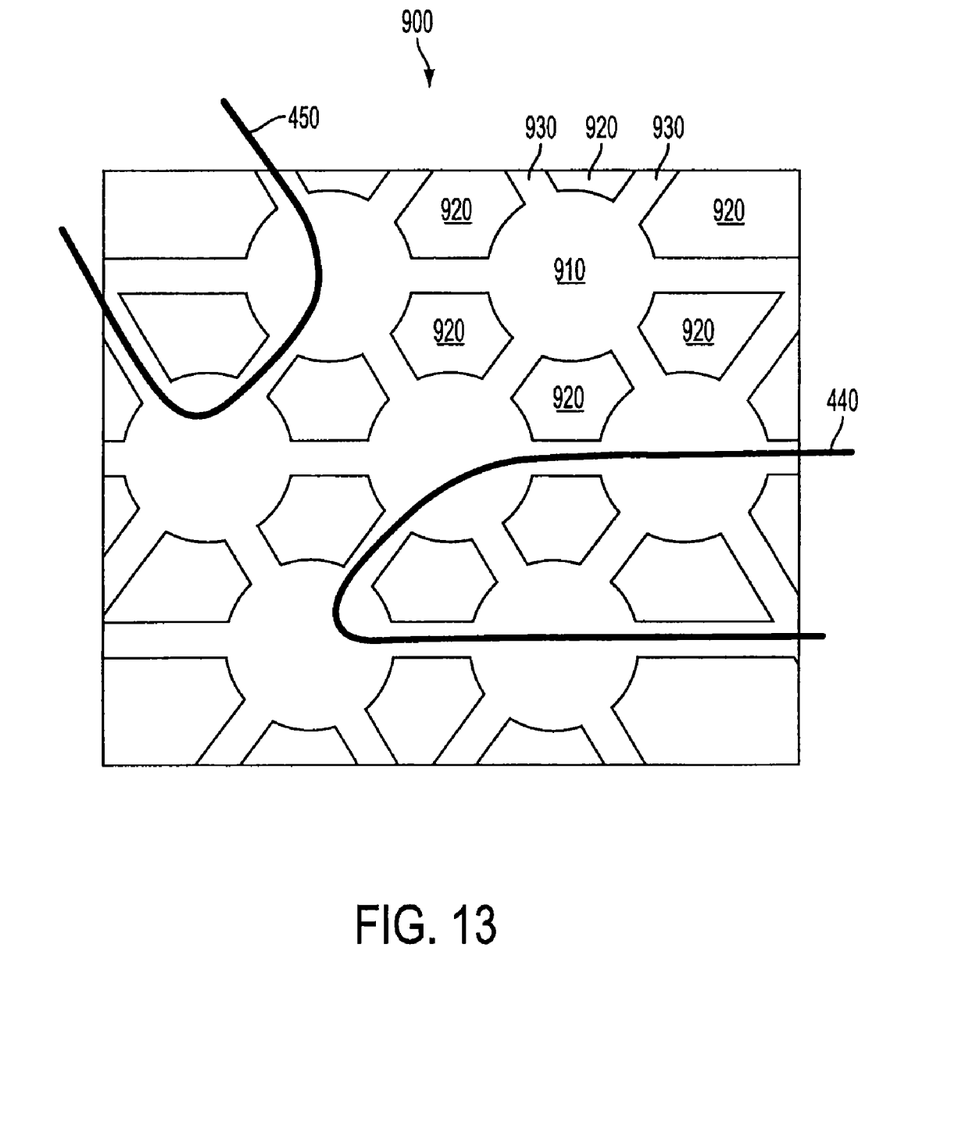
FIG. 13 is a diagram of a top view of an example of the support structure of the present disclosure of FIG. 12 with cables supported therein.

FIG. 13 is a diagram of a top view of an example of the support structure of FIG. 12 supporting cables therein. Here, cable 440 is laid in a horizontal pattern. Cable 450 is laid in a diagonal pattern.

It is to be understood that the support structure is not limited to those illustrated in the above figures, but may include any protrusion, cavity, and/or slot shape, configuration, and/or orientation capable of providing the floor support and cable support functionalities according to the present disclosure.

Figure 14:
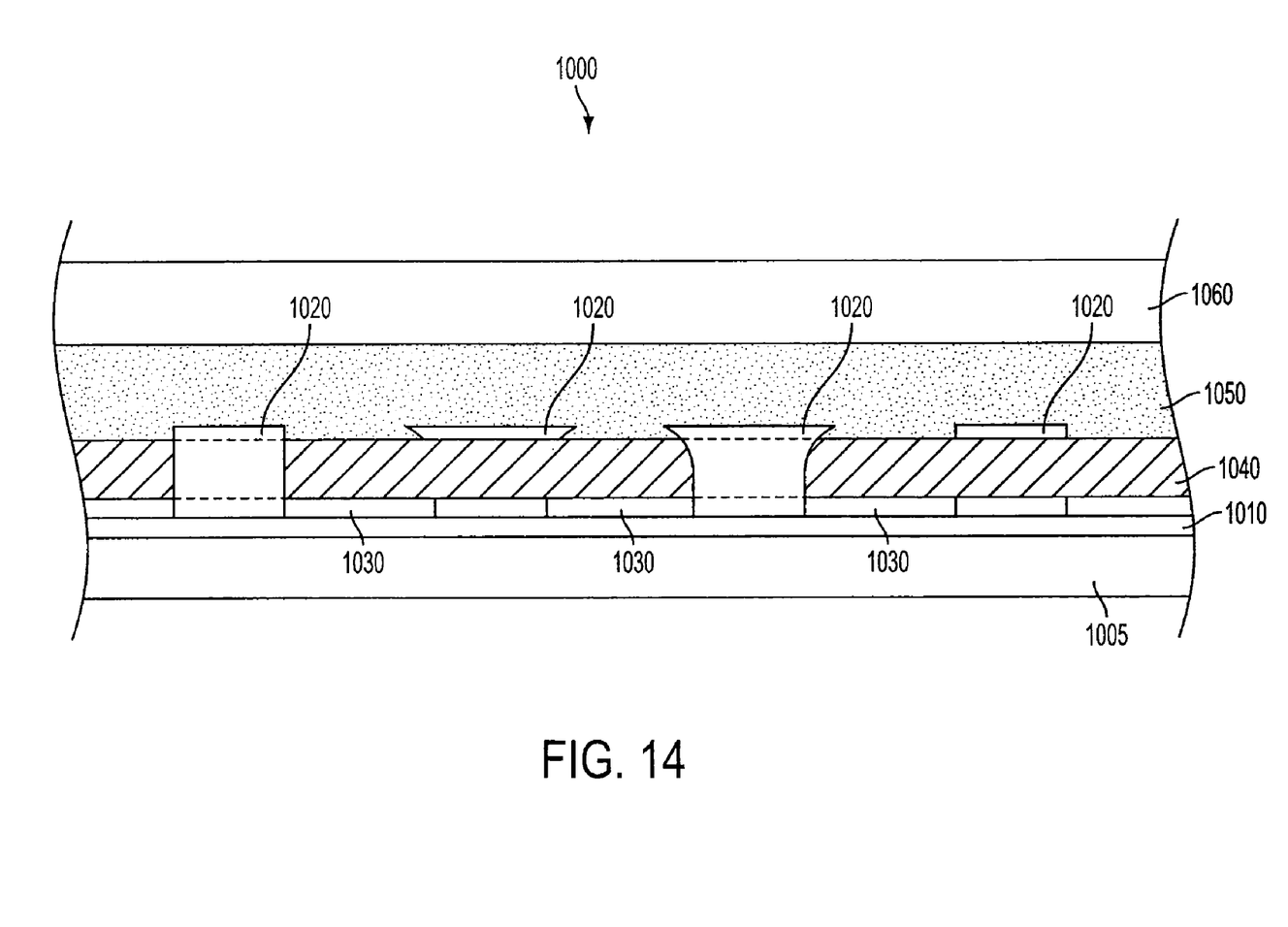
FIG. 14 is a diagram of an example of an installed floor including the support structure of the present disclosure of FIG. 2.

FIG. 14 is a diagram of an example of an installed floor 1000 including the support structure of FIG. 2. The support structure 1010 is disposed on a subfloor 1005 using any adhesive, fastener, or suitable means for fixing the structure 1010 to the subfloor 1005. A cable 1040 is laid into slots 1030 adjacent to protrusions 1020. The structure cavities are filled with a filler 1050, such as mortar, and the cable 1040 and structure 1010 are covered with the filler 1050. The main floor 1060 is laid on top of the filler 1050.

The support structure according to the present disclosure may also be used in walls, ceilings, and other structures to support them and to support heating cables in a similar way as described above regarding the support structure in the floor.

In addition to using the support structure to support heating cables, the structure may be used to support other types of cables. For example, audio cables may be laid to provide audio. Lighting cables may be laid to provide under-surface lighting. Security cables may be laid to provide motion or pressure detection. Electric fencing cables may be laid to provide invisible fencing for animals, for example.

Alternatively, the support structure may be used as an underlying support without cable. Or the support structure may be used to support discrete elements, e.g., sensors, tags, etc., within the slots that connect through wireless communication.

The present disclosure is not limited to the configurations of the support structure described here, but rather may include any configuration capable of supporting floors and cables in accordance with the teachings of the present disclosure.

What is claimed is:

1. A support structure comprising:
   a surface;
   a plurality of protrusions that extend from the surface, wherein the plurality of protrusions include a first protrusion and a second protrusion, the first protrusion having a first overhanging extension, the second protrusion having a second overhanging extension, the first protrusion disposed proximate to and at least partially facing the second protrusion, the first protrusion and the second protrusion defining a pathway therebetween, the pathway underlying the first extension and the second extension; and
   wherein a flexible heating cable is configured to be snapped between the first extension and the second extension and into the pathway, and wherein the cable is configured to be contained in a non-gripping constraint provided by the extensions that is effective to prevent the cable from snapping back through the first extension and the second extension and exiting the pathway and wherein a filler material at least partially fills the pathway wherein the support structure supports a main floor and is supported by an underlying sub-floor;
   wherein the support structure is constructed of a flexible material that is configured to decouple the underlying sub-floor from the main floor;
   wherein the flexible heating cable has a diameter that is greater than a distance between the first extension and the second extension such that it snaps into the pathway during installation.

2. The structure of claim 1, wherein the pathway comprises a slot extending from the top of the first and second protrusions to the surface.

3. The structure of claim 1, wherein the pathway is oriented in one of a horizontal, vertical, or diagonal direction.

4. The structure of claim 1, wherein the pathway has one of a linear or circular configuration.

5. The structure of claim 1, wherein the first and second protrusions are substantially identical in size with one another.

6. The structure of claim 1, wherein the first and second protrusions extend from the surface in substantially the same direction.

7. The structure of claim 1, wherein the pathway forms a geometric shape.

8. The structure of claim 1, wherein the pathway is substantially rectangular in shape.

9. The structure of claim 1, wherein the pathway is substantially circular in shape.

10. A method for supporting a cable, comprising: providing the support structure of claim 1; and placing a cable into the pathway.

11. The method of claim 10, wherein placing the cable comprises placing the cable in at least one of a horizontal, vertical, or diagonal pathway to provide a random configuration.

12. The method of claim 10, wherein the cable is a heating cable.

13. A method for making a support structure, comprising:
   providing a flexible material;
   forming a plurality of protrusions extending from the flexible material wherein the plurality of protrusions includes a first protrusion and a second protrusion, the first protrusion having a first overhanging extension, the second protrusion having a second overhanging extension, the first protrusion disposed proximate to and at least partially facing the second protrusion, a pathway formed between the first protrusion and the second protrusion, the pathway underlying the first extension and the second extension;
   at least partially filling the pathway with a filler material;
   wherein a flexible heating cable is snapped between the first extension and the second extension and into the pathway, and wherein the cable is contained in a non-gripping constraint provided by the extensions that is effective to prevent the cable from snapping back through the first extension and the second extension and exiting the pathway;
   wherein the support structure supports a main floor and is supported by an underlying sub-floor;
   wherein the flexible heating cable has a diameter that is greater than a distance between the first extension and the second extension such that it snaps into the pathway during installation;
   decoupling the underlying sub-floor from the main floor with the support structure.

14. A cable system, comprising:
   a support structure comprising:
   a surface;
   a plurality of protrusions that extend from the surface, wherein the plurality of protrusions includes a first protrusion and a second protrusion, the first protrusion having a first overhanging extension, the second protrusion having a second overhanging extension, the first protrusion disposed proximate to and at least partially facing the second protrusion, the first protrusion and the second protrusion defining a pathway therebetween, the pathway underlying the first extension and the second extension;
   wherein a flexible heating cable is configured to be snapped between the first extension and the second extension and into the pathway, and wherein the cable is configured to be contained in a non-gripping constraint provided by the extensions that is effective to prevent the cable from snapping back through the first extension and the second extension and exiting the pathway;
   wherein the flexible heating cable has a diameter that is greater than a distance between the first extension and the second extension such that it snaps into the pathway during installation;
   wherein a filler material at least partially fills the pathway;
   wherein the support structure supports a main floor and is supported by an underlying sub-floor;
   wherein the support structure is constructed of a flexible material that is configured to decouple the underlying sub-floor to a main floor.

* * * * *